United States Patent [19]

Egami

[11] Patent Number: 4,872,183

[45] Date of Patent: Oct. 3, 1989

[54] DATA TRANSMISSION APPARATUS WITH REMOTE REPEATER

[75] Inventor: Noritaka Egami, Nagasaki, Japan

[73] Assignee: Mitsubishi Denki Kabushiki Kaisha, Tokyo, Japan

[21] Appl. No.: 241,244

[22] Filed: Sep. 7, 1988

[30] Foreign Application Priority Data

Sep. 8, 1987 [JP] Japan ................................ 62-223063
Sep. 11, 1987 [JP] Japan ................................ 62-226656

[51] Int. Cl.$^4$ ............................................. H04B 7/17
[52] U.S. Cl. .................................... 375/3; 178/71 R; 178/71 T
[58] Field of Search ..................... 375/3, 3.1; 370/13.1, 370/85, 88, 97, 111; 340/825.01, 825.05, 870.18; 379/4, 342; 178/71 R, 71 S

[56] References Cited

U.S. PATENT DOCUMENTS

| | | | |
|---|---|---|---|
| 3,739,098 | 6/1973 | Camiciottoli et al. | 375/3 |
| 4,052,670 | 10/1977 | Watanabe et al. | 375/3 |
| 4,606,049 | 8/1986 | Daniel | 340/870.18 |
| 4,607,376 | 8/1986 | Sasaki | 375/3 |
| 4,633,464 | 12/1986 | Anderson | 370/111 |
| 4,700,342 | 10/1987 | Egami | 370/85 |
| 4,796,278 | 1/1989 | Naka | 375/3.1 |

FOREIGN PATENT DOCUMENTS 61-187440 8/1986 Japan .

Primary Examiner—Benedict V. Safourek
Assistant Examiner—Stephen Chin
Attorney, Agent, or Firm—Bernard, Rothwell & Brown

[57] ABSTRACT

A data transmission apparatus including remote repeater lines comprising the first and second remote repeaters, each respectively providing first receiver and driver which receive the one signal of the signals of first and second transmission buses and output the signal to the other side, second receiver and driver which receive the other signal and output the signal to the one side, first and second carrier detecting circuits which respectively detect the carriers of respective signals, a decision circuit which inputs such detected outputs and decides which one of first and second receivers has operated first and first and second AND circuits the one of which respectively opens and the other closes depending on output of the decision circuit, and the cables which connect in direct such first and second remote repeaters to link said first and second transmission buses; in which n (n is a positive integer of 2 or larger) remote repeater lines are connected in parallel between said first and second transmission buses and the decision control elements which decide the remote repeaters having higher priority do not operate normally and sequentially exchanges the remote repeaters to those having lower priority are provided respectively to said n first and second remote repeaters.

6 Claims, 9 Drawing Sheets

DATA TRANSMISSION APPARATUS WITH REMOTE REPEATER

BACKGROUND OF THE INVENTION

1. Field of the Invention

The present invention relates to a data transmission apparatus including a plurality of stations linked in the form of multidrop and more specifically to a data transmission apparatus including a plurality of remote repeaters as the regenerating repeaters for data transmission between respective stations.

2. Description of the Prior Art

A block diagram indicating a structure of the conventional transmission apparatus, for example, of the U.S. Pat. No. 4,700,342 is shown in FIG. 1. In this figure, a first and a second signal lines 11 and 21, each consisting generally of twisted pair cable or coaxial cable, are used as the transmission buses for signal transmission. Provided at both ends of the first and second transmission lines 11 and 21 are terminating resistors 12, 13, 22, 23 for transmission line impedance matching. The first and second signal lines 11 and 21 are respectively linked to the transmitting and receiving stations 14, 15, 24 and 25. These first and second signal lines are further linked respectively to a first and a second remote repeaters 16, 26, which are connected through a remote repeater cable 31, consisting of twisted pair cable or coaxial cable.

A remote repeater line 30 is formed by the first and second remote repeaters 16 and 26 and the cable 31.

A block diagram indicating a structure of the first remote repeater 16 of FIG. 1 is shown in FIG. 2. In this figure, the signal sent from the first signal line 11 and cable 31 is received by first and second receivers 41, 51. The signal received by the first and second receivers 41 and 51 is waveform-shaped by first and second waveform shaping circuits 42, 52. A carrier is detected from the signal output from the first and second receivers 41, 51 by first and second carrier detecting circuits 43, 53. Detection sequence of carrier output from the first and second carrier detecting circuits 43, 53 is decided by a decision circuit 44. Outputs of the first and second waveform shaping circuits 42, 52 and decision circuit 44 are input to first and second AND circuits 45, 55. Outputs of the first and second AND circuits 45 and 55 are respectively output to the first signal line 11 and cable 31 by first and second drivers 46, 56.

The first remote repeater 16 has the structure designed for bothway transmission using the first and second receivers 41, 51 and the first and second drivers 46, 56.

The second remote repeater 26 has the same structure as the first remote repeater 16.

Next, operation for sending the signal from the station 14 will be explained hereunder.

When the signal is first transmitted to the first signal line 11 from the station 14, the first receiver 41 of the first remote repeater 16 receives the carrier sent from the first signal line 11. Thereby the first carrier detecting circuit 43 turns ON and the decision circuit 44 sends a signal to open the first AND circuit 45, upon reception of the carrier from the first signal line 11. Therefore, the signal received by the first receiver 41 is output, upon shaping by the first waveform shaping circuit 42, to the cable 31 from the first driver 46 through the first AND circuit 45.

The second remote repeater 26 having received the signal from the cable 31 shapes waveform of the signal received from the cable 31 and then outputs the signal to the second signal line 21 like the first remote repeater 16. Therefore, the stations 24, 25 can receive the signal from the station 14.

Such operation conceives a problem that the signal output from the first driver 46 of the first remote repeater 16 is received in direct by the second receiver 51 and thereby the second carrier detecting circuit 53 turns ON.

However, the decision circuit 44 detects which circuit of the first and second carrier detecting circuits 43, 53 becomes active precedingly and decides an output. Accordingly, the decision circuit 44 does not disturb the signal waveform of the first signal line 11 by operating the second driver 56. Namely, as shown in the time chart of FIG. 3, the first AND circuit 45 opens and the second AND circuit 55 closes. Next, when the station 14 suspends transmission of signal, the first carrier detecting circuit 43 turns OFF and the decision circuit 44 closes the first AND circuit 45, waiting for detection of the next carrier.

Moreover, operation of the first remote repeater 16 in transmission of signal from the station 24 will be explained hereunder.

First, the second receiver 51 of the first remote repeater 16 receives the carrier from cable 31, the second carrier detecting circuit 53 turns ON and decision circuit 44 confirms reception of carrier from the cable 31 and sends an output to open the second AND circuit 55. Thereby, the signal received by the second receiver 51 is once shaped by the second waveform shaping circuit 52 and is output to the first signal line 11 from the second driver 56 passing through the second AND circuit 55. Terefore, the stations 14, 15 are capable of receiving the signal from the station 24.

The transmission apparatus of the prior art is thus constituted as explained above. Namely, the first and second signal lines 11 and 21 are linked with the remote repeater line 30 for one channel. Therefore, such transmission apparatus results in a problem that transmission becomes impossible if the outdoor cable 31 laid for long distance is broken, for example, by construction work.

SUMMARY OF THE INVENTION

It is therefore an object of the present invention to provide a transmission apparatus which has improved reliability by providing the remote repeater lines for plural channels to link the first and second signal lines.

The transmission apparatus of the present invention forms a remote repeater line by providing a first control signal generating circuit which generates a signal to open the second AND circuit from a significant signal to close the second AND circuit sent from the input terminal and a second control signal generating circuit which generates insignificant signal to close the second AND circuit from the signal output from the second receiver and the significant signal and then outputs such insignificant signal from the output terminal to the first and second remote repeaters, and connects a plurality of remote repeater lines in parallel between the first and second signal lines and also connects between input and output terminals of the first and second remote repeaters.

Moreover, the transmission apparatus of the present invention connectes in parallel a plurality of remote repeater lines between the first and second signal lines as explained previously and also provides the first and second decision circuits which decide which remote repeater of the first and second repeaters has operated precedingly with the signal sent from the cable and effectively operates the remote repeater which has operated first.

DETAILED DESCRIPTION OF THE PREFERRED EMBODIMENTS

The preferred embodiments of the data transmission apparatus including the remote repeaters of the present invention will be explained hereunder in detail with reference to the accompanying drawings.

Figure 1:
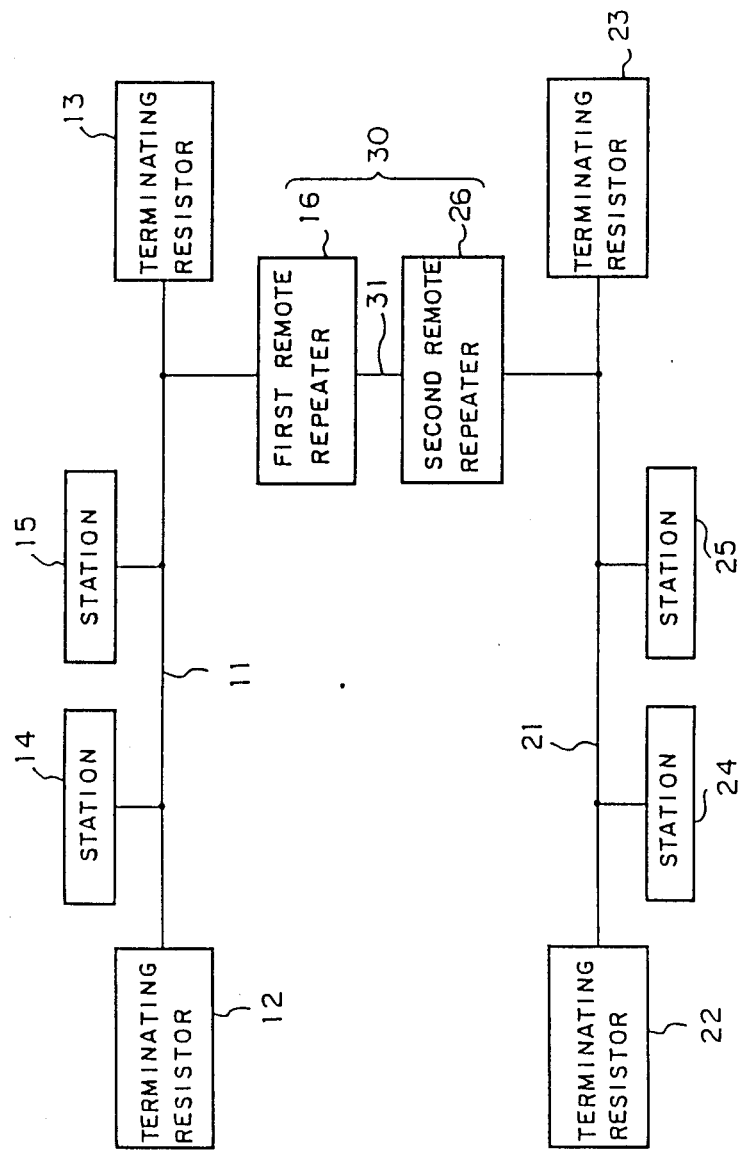
FIG. 1 is a block diagram indicating an example of a data transmission apparatus of the prior art including remote repeaters.
Figure 2:
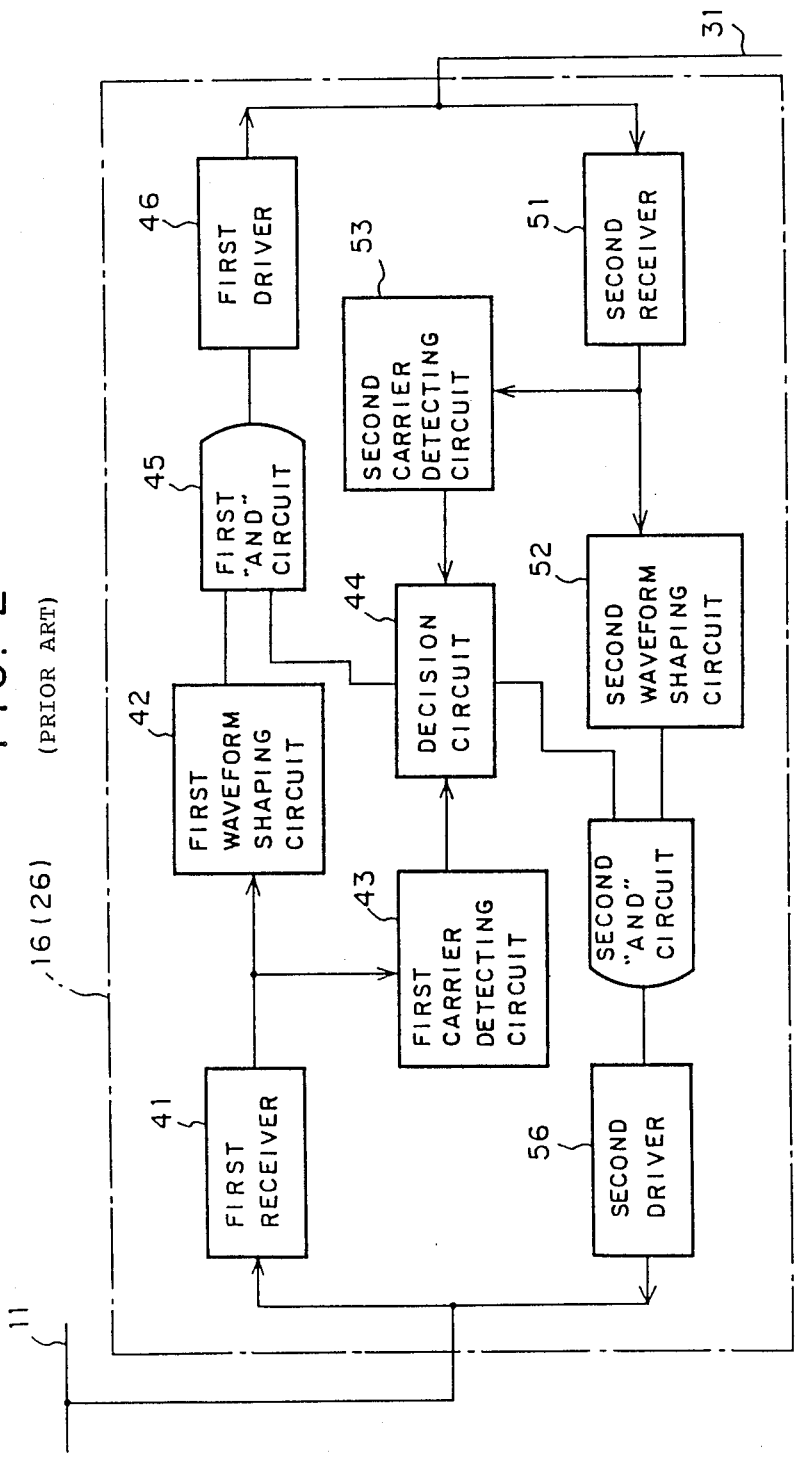
FIG. 2 is a block diagram indicating a remote repeater of the data transmission apparatus shown in FIG. 1.
Figure 3:
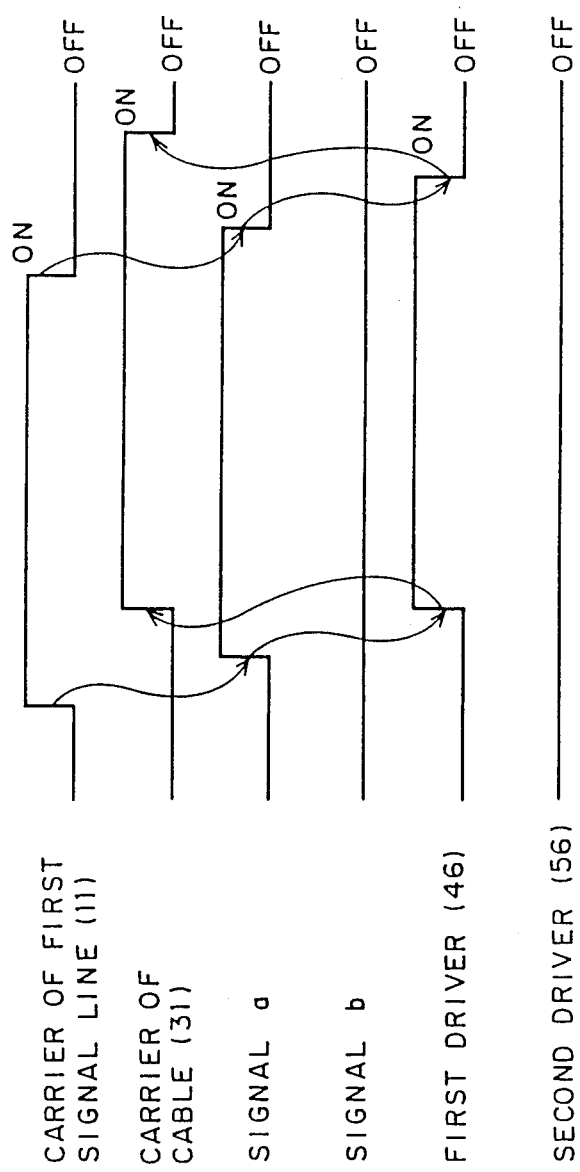
FIG. 3 is a time chart for explaining operation of the remote repeater shown in FIG. 2.
Figure 4:
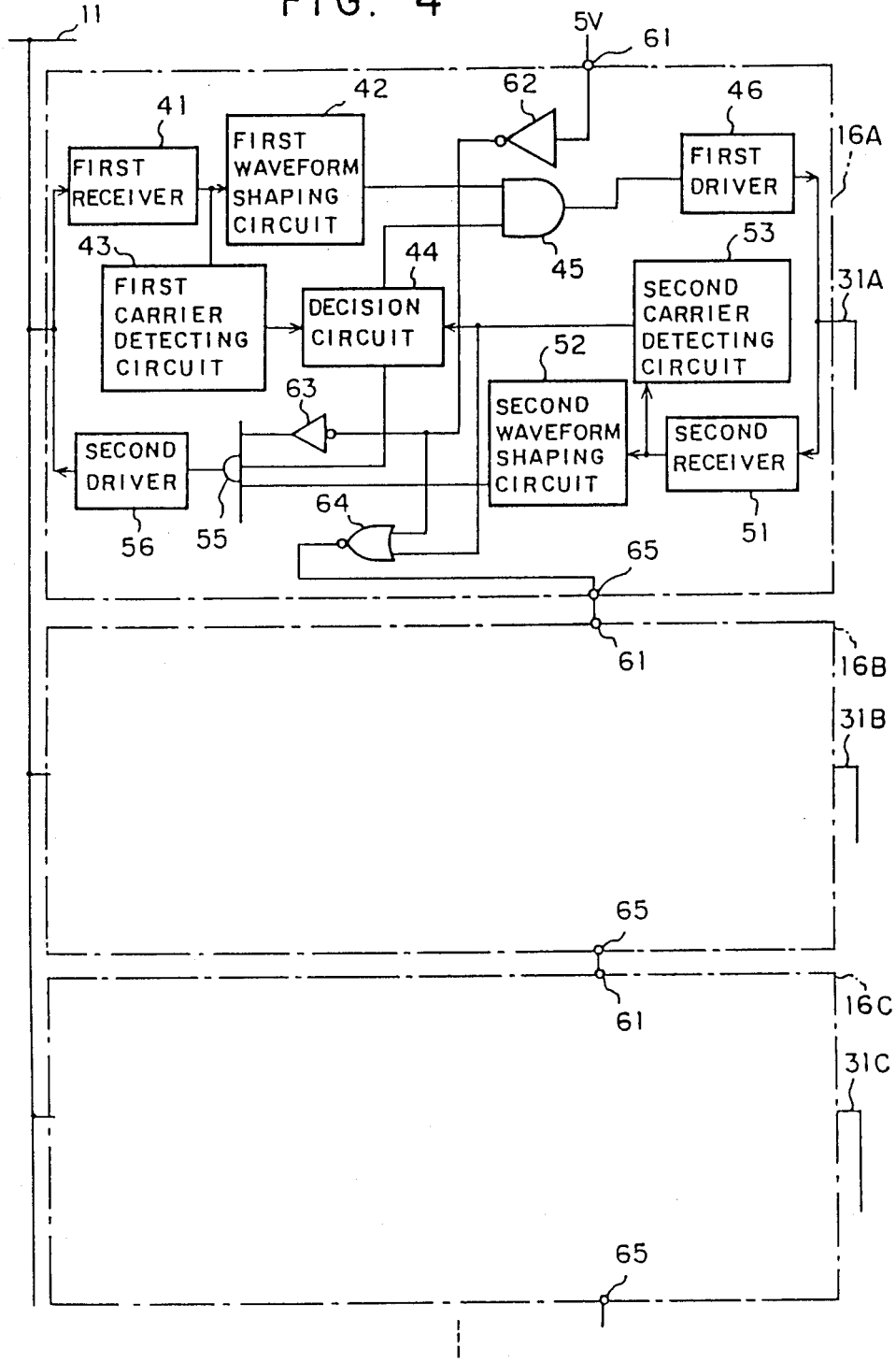
FIG. 4 is a block diagram indicating a structure of the first remote repeater forming a transmission apparatus depending on the first embodiment of the present invention.

In FIG. 4, the elements identical or corresponding to those of FIG. 1 and FIG. 2 are given the same numerals or symbols. 16A, 16B and 16C are first remote repeaters connected with the second remote repeaters (not illustrated) with cables 31A, 31B and 31C for remote repeaters, each consisting of twisted pair cable or coaxial cable.

61 is input terminal; 62 and 63 are inverters forming the first control signal generating circuit which generate the signal to open the second AND circuit 55 from significant signal of the input terminal 61; 64 is NOR circuit which inputs the output of the second carrier detection circuit 53 and inverter 62 and 65 is output terminal.

The second AND circuit 55 is a 3-input AND circuit and a voltage of +5 V is applied as the significant signal to the input terminal 61 of the first remote repeater 16A.

The second control signal generating circuit which generates the insignificant signal to close the second AND circuit 55 from the signal output of the second receiver 51 and the significant signal is formed by the inverter 62 and NOR circuit 64.

The decision control means is constituted by these first and second control signal generating circuits.

Figure 5:
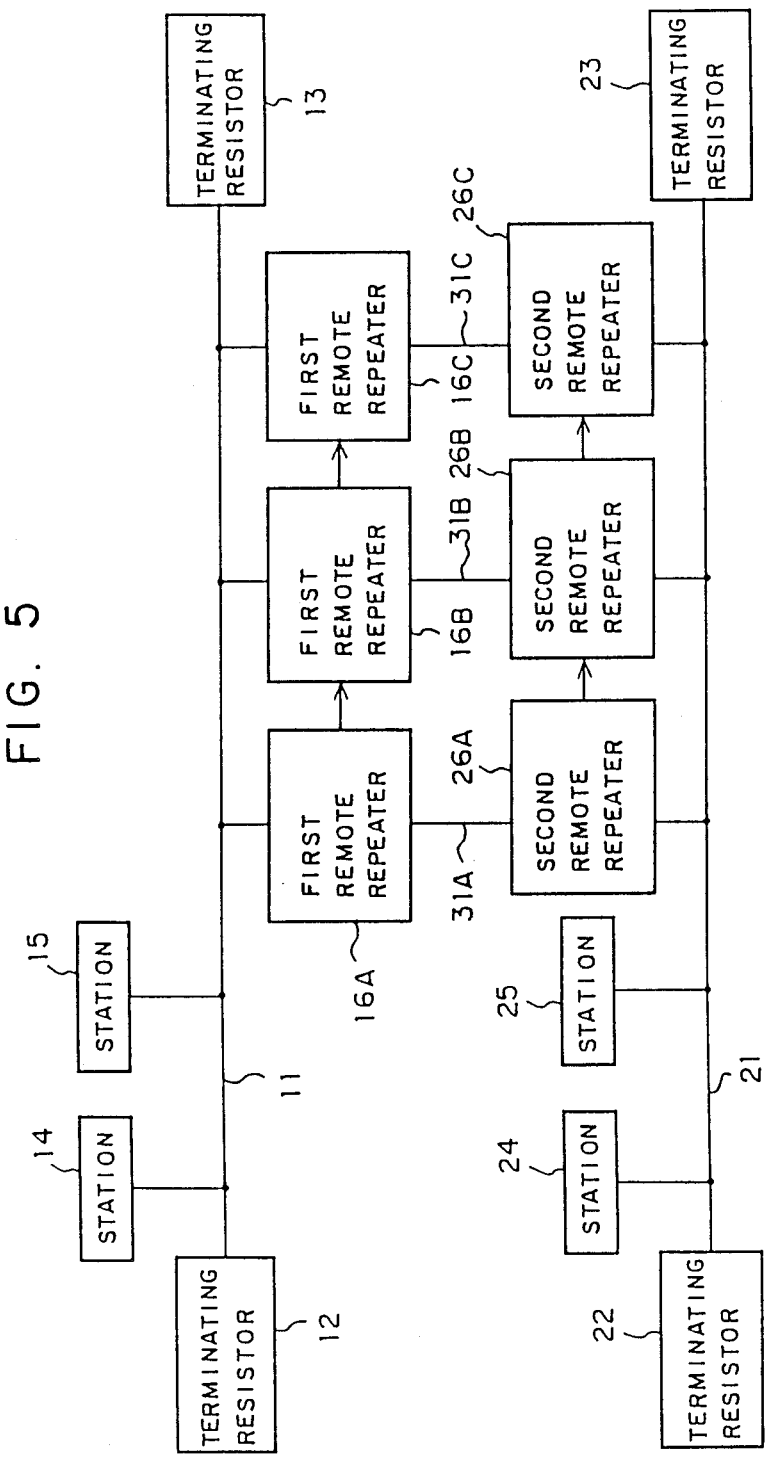
FIG. 5 is a block diagram indicating a transmission apparatus formed by the first remote repeater shown in FIG. 4.

FIG. 5 is a block diagram indicating a transmission apparatus formed by the first remote repeaters 16A, 16B, 16C shown in FIG. 4. In this figure, 26A, 26B, 26C are second remote repeaters having the same structure as the first remote repeaters 16A, 16B, 16C.

Next, operation will be explained hereunder. When stations 14 and 15 or 24 and 25 send the signal, operation of the first remote repeaters 16A, 16B, 16C or 26A, 26B, 26C which receive the signals from the first or second signal lines 11, 21 are the same as those already explained and therefore such operation is not explained here. Therefore, operation in such a case that the first remote repeaters 16A, 16B, 16C or the second remote repeaters 26A, 26B, 26C receive the signals from the cables 31A, 31B, 31C and output the signals to the first and second signal lines 11 and 21 will be explained with reference to the first remote repeaters 16A, 16B, 16C.

When the first remote repeaters 16A, 16B, 16C receive the signals from the cables 31A, 31B, 31C, the second carrier detecting circuit 53 turns ON by detecting the carrier received by the second receiver 51. Therefore, the decision circuit 44 confirms that the carrier is received and sends an output to close the second AND circuit 55.

The signal received by the second receiver 51 is shaped by the second waveform shaping circuit 52 and is then output to the second AND circuit 55.

Figure 6:
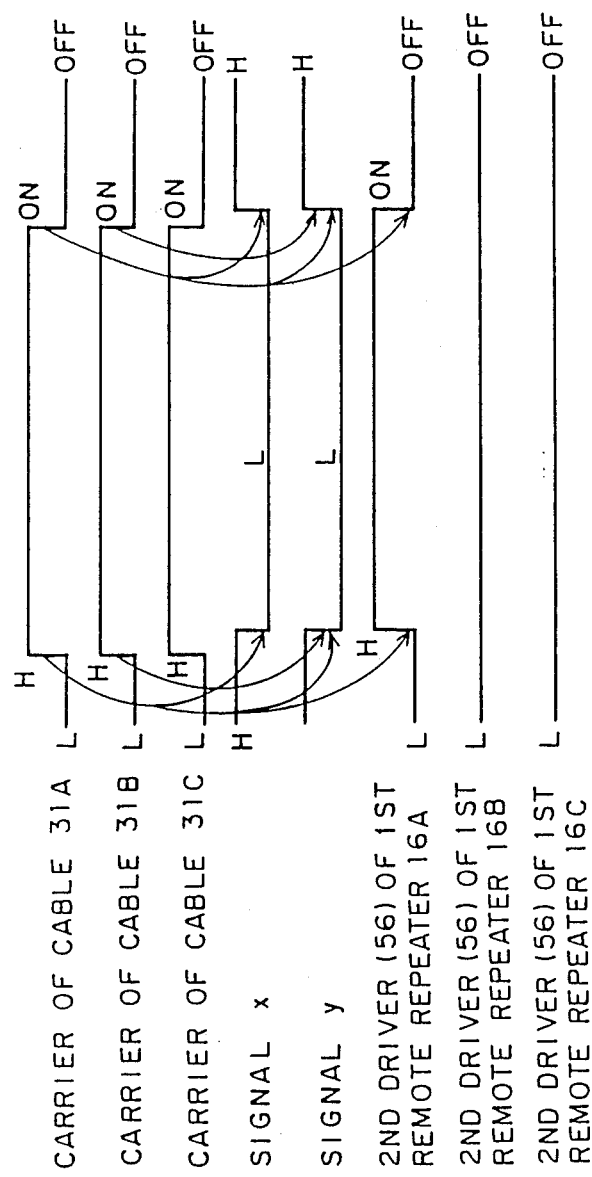
FIG. 6 is a time chart of the first remote repeater shown in FIG. 4.

In this case, since the significant signal (high level "H") is being applied to the input terminal 61 of the first remote repeater 16A, the second AND circuit 55 is caused to open by the signal coming through the inverters 62, 63 and the signal sent from the second waveform shaping circuit 52 is output to the first signal line 11 from the second driver 56. However, since the insignificant signal × (low level "L") is output to the output terminal 65 of the first remote repeater 16A, the second AND circuit 55 of the first remote repeater 16B is kept closed. The signal from the second waveform shaping circuit 52 is no longer output to the first signal line 11 from the second driver 56 and the signal is also no longer output to the first signal line 11 from the first remote repeater 16C. The time chart of such operation is shown in FIG. 6.

As explained previously, when the cables 31A, 31B and 31C are normal, the signal is output to the first signal line 11 from the first remote repeater 16A. However, if the cable 31A breaks, the significant signal (high level "H") is output from the output terminal 65 of the first remote repeater 16A. Therefore the signal is output to the first signal line 11 from the first remote repeater 16B.

Therefore, the first remote repeaters 16A, 16B and 16C are given the priority sequence and even if the cable 31A of the remote repeater line having the first priority breaks and can no longer be used, other remote repeater lines may be used and reliability can be as much improved as a whole.

In above first embodiment, the first and second signal lines 11, 21 are linked with the remote repeater line of three channels, but it is enough when the two or more channels of remote repeater lines are used and the more increases the channels of remote repeater lines, the more reliability of transmission can be improved.

Moreover, in above embodiment, the twisted pair cables or coaxial cables are used as the cables 31A, 31B and 31C, but an optical fiber cable may also be used.

The one input of NOR circuit 64 is used as the output of the second carrier detecting circuit 53 but the same operation can be conducted even when it used 10 as the output of the second receiver 51.

In addition, the high level signal is used as the significant signal to be applied to the input terminal 61, but in case the low level signal is used as the significant signal, the inverter 62 is no longer necessary and the NOR circuit 64 is replaced as the OR circuit.

Next, the second embodiment of the present invention will be explained with reference to FIG. 7 to FIG. 9.

Figure 7:
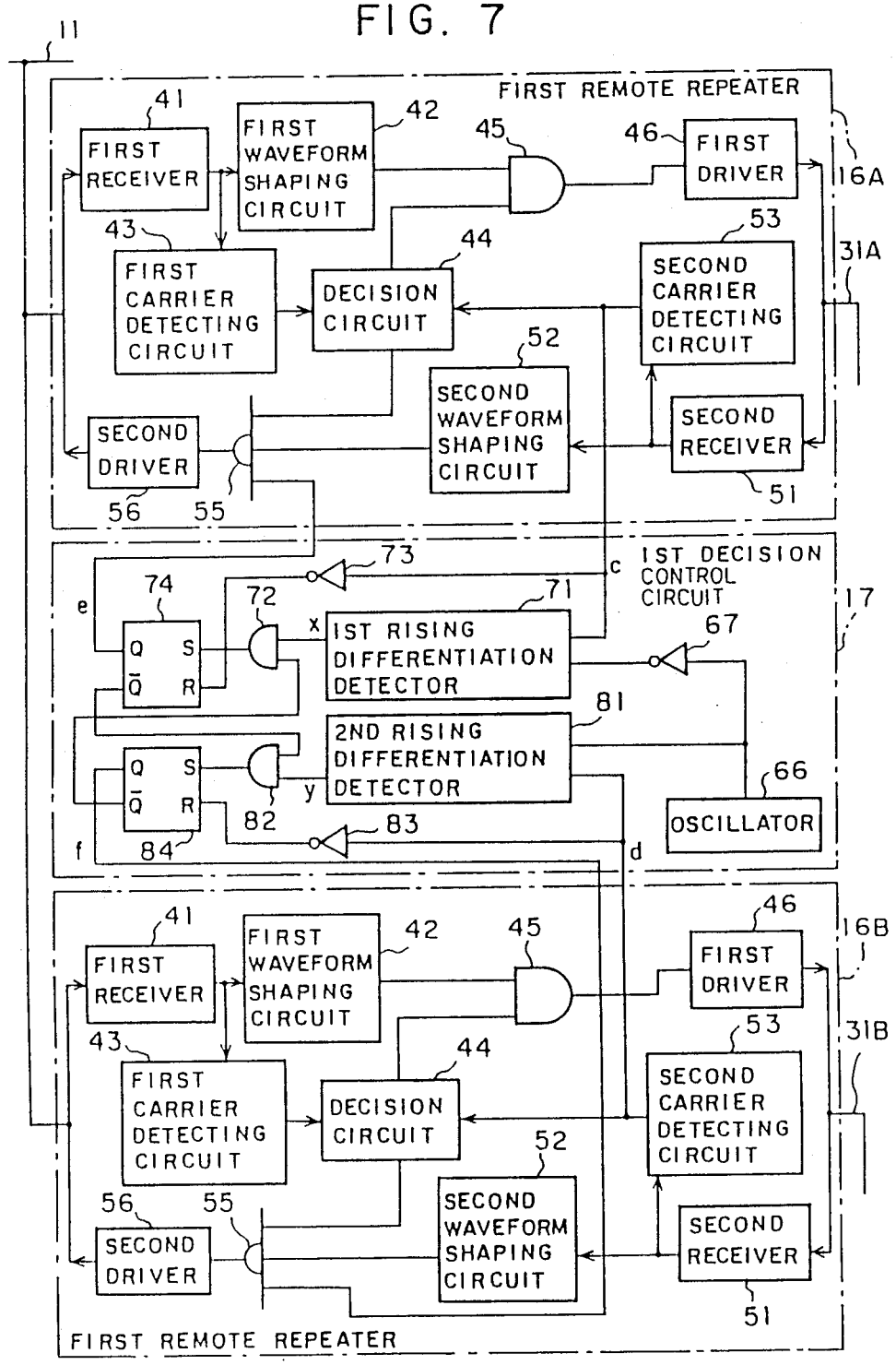
FIG. 7 is a block diagram indicating a structure of the first decision circuit forming a transmission apparatus depending on the second embodiment of the present invention.

In FIG. 7, the elements like those of FIG. 1 are given the like numerals or symbols. 16A and 16B are first remote repeaters. 31A and 31B are cables for remote repeaters connecting the first remote repeaters 16A, 16B and the second remote repeater (not illustrated), consisting of the twisted pair cable or coaxial cable.

17 is first decision control circuit which decides which one of the first remote repeaters 16A and 16B has operated first with the signal sent from the cables 31A or 31B and effectively operates the first remote repeater 16A or 16B which has started first.

The first decision control circuit 17 will be explained in detail. 66 is oscillator which outputs the clock having the frequency higher than the tansmission frequency. 67 is first inverter which inverts output of the oscillator 66.

71 and 81 are first and second rising differentiation detecting circuit which generates outputs synchronized with the clock. The first rising differentiation detecting circuit 71 inputs the outputs of the second carrier detecting circuit 53 and the first inverter 67 of the first remote repeater 16A, while the second rising differentiation detecting circuit 81 inputs the outputs of the second carrier detecting circuit 53 and oscillator 66 of the first remote repeater 16B.

72 and 82 are respectively third and fourth AND circuits. The outputs of first and second rising differentiation detecting circuits 71 and 81 are respectively applied to the one input of such AND circuits and outputs of output terminals $\overline{Q}$ of the second and first RS flip-flops 74 and 84 are respectively applied to the other input thereof.

73 and 83 are second and third inverters which invert the outputs of second carrier detecting circuits 53 of the first and second remote repeaters 16A, 16B. 74 and 84 are first and second RS flip-flops. The outputs of the third and fourth AND circuits 72, 82 are supplied to the set terminals S, while the outputs of the second and third inverters 73, 83 are supplied to the reset terminals R. Simultaneously, output of the output terminal Q is supplied respectively to the second AND circuits 55 of the first remote repeaters 16A and 16B.

The first decision control circuit 17 is formed by the oscillators 61~first and second RS flip-flops 74, 84 and the second AND circuit 55 is the 3-input AND circuit.

Figure 8:
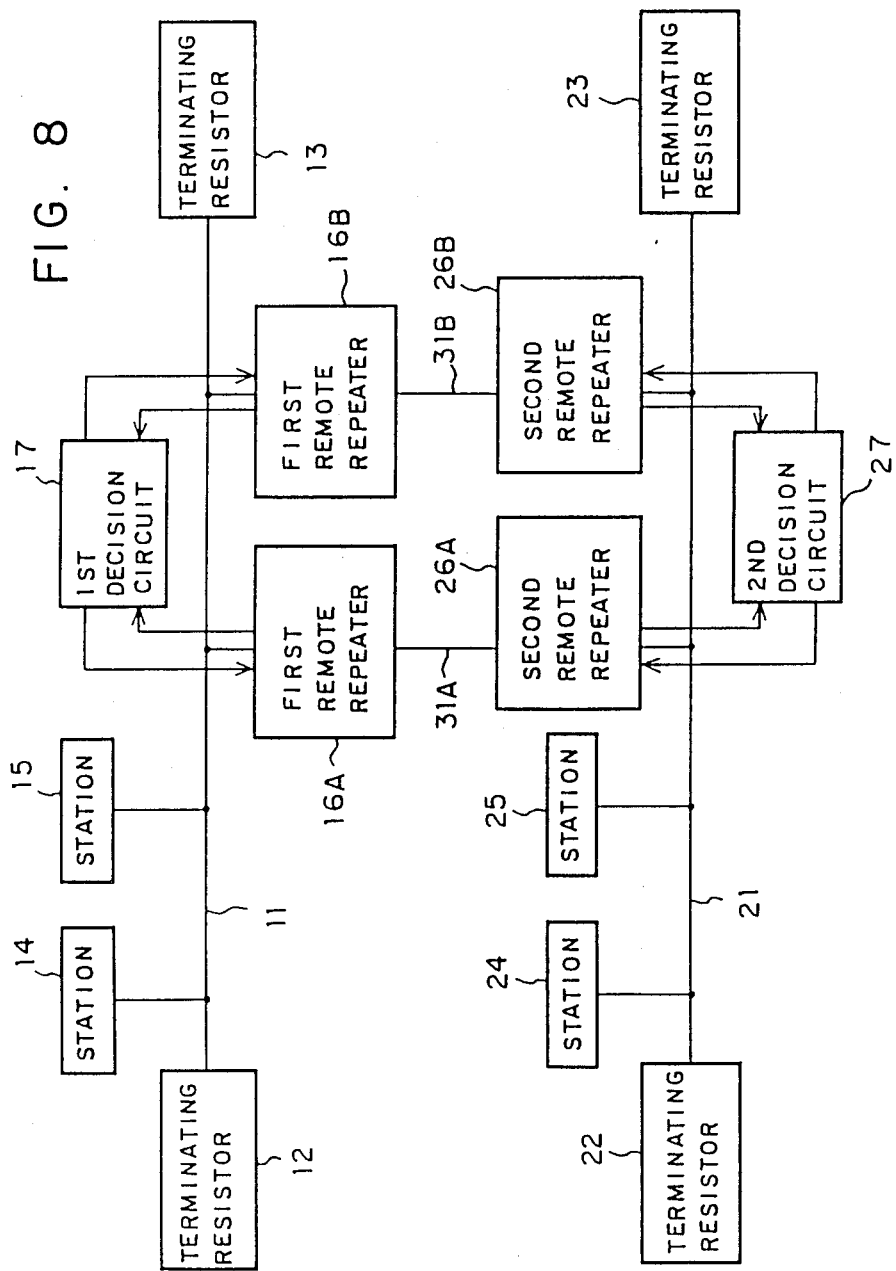
FIG. 8 is a block diagram indicating a transmission apparatus depending on the second embodiment of the present invention formed by the first remote repeater and the first decision circuit shown in FIG. 7.

FIG. 8 is a block diagram of the transmission apparatus formed by utilizing the first decision control circuit 17 shown in FIG. 7. In this figure, 26A and 26B are second remote repeaters having the same structure as the first remote repeaters 16A, 16B.

27 is second decision control circuit having the same structure as the first decision control circuit 17.

Figure 9:
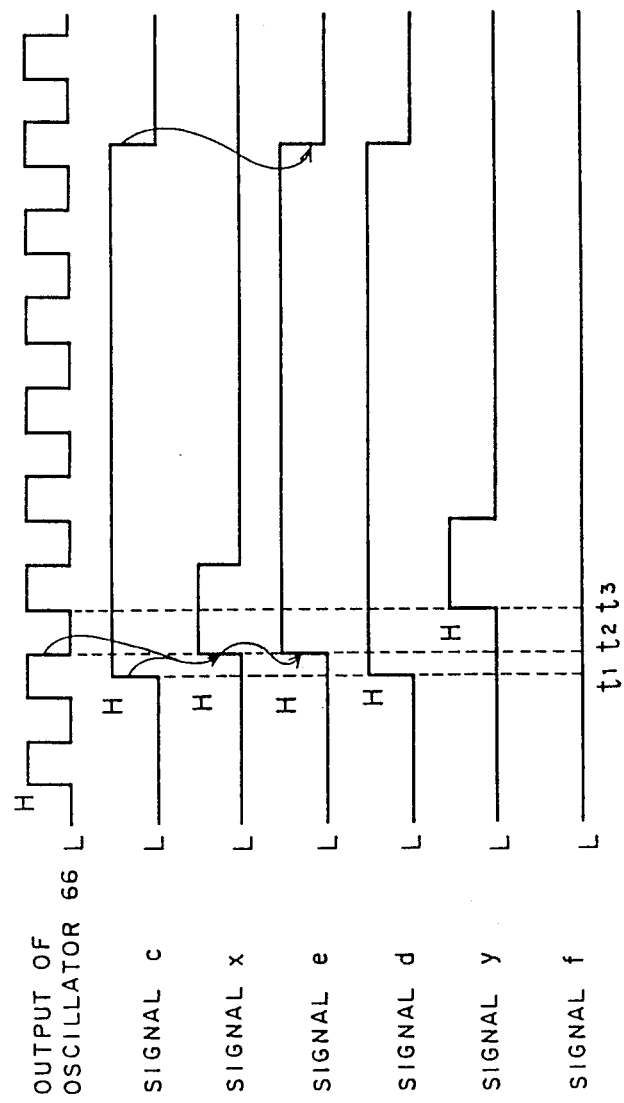
FIG. 9 is a time chart of the first decision circuit shown in FIG. 7.

FIG. 9 is time chart of the first decision control circuit 17 shown in FIG. 7.

Operation will be then explained hereunder.

When the stations 14, 15 or 24 and 25 tranmsmit the signals, the first and second remote repeaters 16A, 16B or 26A, 26B which receive the signals of the first and second signal lines 11 and 21 operate in the same way as explained earlier. Therefore, explanation thereof is omitted here. Explained with reference to the first remote repeaters 16A and 16B is the case where the first and second remote repeaters 16A, 16B, 26A, 26B receive the signals from the cables 31A, 31B and output the signals to the first and second signal lines 11 and 21.

When the first remote repeaters 16A and 16B receive the signal from the cables 31A, 31B at the timing $t_1$, as shown in FIG. 9, under the condition of the oscillator 66 outputs the clock, the second carrier detecting circuit 53 turns ON by detecting the carrier received by the second receiver 51. Therefore, the decision circuit 44 confirms that the carrier is received and sends the output signal C to open the second AND circuit 55. The signal received by the second receiver 51 is shaped by the second waveform shaping circuit 52 and then output to the second AND circuit 55.

In this case, since the "L" level clock is supplied to the first rising differentiation detecting circuit 71 of the first decision control circuit 17, while the "H" level clock to the second rising differentiation detecting circuit 82, the "H" level output is supplied at the timing $t_2$ to the third AND circuit 72 from the first rising differentiation detecting circuit 71. Therefore, the "H" level output signal e is supplied to the second AND circuit 55 of the first remote repeater 16A from the output temrinal Q of the first RS flip-flop 74 and the signal sent from the second waveform shaping circuit 52 is output to the signal line 11 from the second driver 56.

In the timing $t_3$, the "H" level output is supplied to the fourth AND circuit 82 from the second rising differentiation detecting circuit 81 but the "L" level output signal f is supplied to the second AND circuit 55 of the first remote repeater 16B from the output terminal Q of the second RS flip-flop circuit 84. Therefore, the second AND circuit 55 is kept closed and the signal sent from the second waveform shaping circuit 52 is no longer output to the first signal line 11 from the second driver 56.

As explained previously, even when the cables 31A and 31B are normal and simultaneously the first remote repeaters 16A and 16B operate, the signals are output to the first signal line 11 from the first remote repeater 16A or 16B depending on decision by the first decision control circuit 17.

Therefore, if the one cable 31A or 31B of remote repeater lines for two channels can no longer be used because it breaks, the other remote repeater line can be used, as much improving reliability.

In the embodiment explained earlier, the first and second singal lines 11 and 21 are connected with the remote repeater lines for two channels, but it is enough for the remote repeater line to have the capacity of two or more channels. The more the number of channels increase, the more reliability of transmission can be improved. In case the remote repeater line having the capacity of three or more channels is connected, one remote repeater line can be used effectively by connecting in parallel or series the first and second decision control circuits 17, 27.

The first and second decision circuits 17, 27 have the structure shown in FIG. 7 but it is of course possible to use the other circuit structure which provides the same function as above decision circuits.

Moreover, the twisted pair cable or coaxial cable is used as the cable 31, but an optical fiber cable can also be used and the output of the second carrier detecting circuit 53 is used as the signals c and d, but it may certainly be replaced with an output of the second receiver 51 for assuring the same operation.

As explained earlier, the data transmission apparatus including the remote repeater of the present invention provides following effects.

First, the present invention constitutes the remote repeater circuits by providing, to the first and second remote repeaters, the first control signal generating circuit which generates the signal to open the second AND circuit from the significant signal sent from the input terminal to open the second AND circuit and the second control signal generating circuit which generates the insignificant signal to close the secnod AND circuit from the signal output from the second receiver and the significant signal and outputs this signal from the output terminal, and connects in parallel such remote repeater lines of plural channels between the first and second signal lines and simultaneously connects the input terminals and output terminals between the first remote repeaters and the second remote repeaters, thereby providing the effect that the reliability can be improved because if the cable of the remotre repeater line having the highest priority breaks, the remote repeater line having the next highest priority becomes effective, namely if the one line of the remote repeater lines breaks and can no longer be used, the other remote repeater lines may be used.

Second, the present invention connects a plurality of remote repeater lines between the first and second signal lines and provides the first and second decision circuits which decide which first or second remote repeater of the plural first and second remote repeaters has operated first and effectively operates the first or second remote repeater which has started first. Thereby, if the one line of remote repeater lines breaks and can no longer be used, the other remote repeater line can be used, providing the effect that reliability can be as much improved.

What is claimed is:

1. A data transmission apparatus including remote repeaters comprising remote repeater lines formed by first and second remote repeaters connected in series through cables between first and second transmission buses respectively having stations;
said first and second remote repeaters comprising
a first receiver and driver which receive signals from the one transmission bus and outputs signals to the other transmission bus,
a second receiver and driver which receives signals from the other transmission bus and outputs signals to one transmission bus,
first and second carrier detecting circuits which detect carriers of signals received from the one and other transmission buses respectively through said first and second receivers,
a decision circuit which decides which first or second receiver has operated first by inputting the detected output of the first and second carrier detecting circuits and,
first and second AND circuits any one of which is set to the ON state or the OFF state depending on an output of the decision circuit wherein;
a plurality of remote repeater lines from the first to n-th (n is a positive integer equal to or larger than 2) lines are provided and connected in parallel between said first and second transmission buses, and
a decision control means, which always controls data transmission toward the remote repeater lines having lower priority through sequential exchange by providing the output of significant or insignificant signal upon decision that the remote repeaters having higher priority can no longer operate normally, is provided respectively to the first and second remote repeaters forming said first to nth remote repeater lines.

2. A data transmission apparatus including remote repeaters according to claim 1, wherein said decision control circuit constitutes said remote repeater lines by providing, to said first and second remote repeaters, a first control signal generating circuit which generates a signal to set to ON said second AND circuit from the significant signal to set to ON said second AND circuit sent from the input terminal and a second control signal generating circuit which generates an insignificant signal to set to OFF said second AND circuit from the signal output by said second receiver and said significant signal and outputs such insignificant signal from the output terminal, and thereby connects in parallel a plurality of remote repeater lines between said first and second signal lines and also connects said input terminal and output terminal between said first remote repeaters and second remote repeaters.

3. A data transmission apparatus including remote repeaters according to claim 2, wherein
said first control signal generating circuit comprises a first inverter which inverts an input signal sent from said input terminal and a second inverter which receives an inverted output of said first inverter and inverts the signal again as the output; and
said second control signal generating circuit comprises said first inverter and a NOR circuit which receives output of said first inverter and output of said second carrier detecting circuit which detects the carrier of the signal sent from said the other bus and outputs the significant signal when both outputs are insignificant.

4. A data transmission apparatus including remote repeaters according o claim 2, wherein first and second waveform shaping circuits which shapes waveforms of respective outputs of the first and second receivers forming said remote repeaters are provided between the first receiver and first AND circuit and between the second receiver and second AND circuit,
said second AND circuit is formed by said second inverter, said decision circuit and the 3-input AND circuit which receives respective outputs of said second waveform shaping circuit.

5. A data transmission apparatus including remote repeaters according to claim 1, wherein said decision control means provides a first decision control circuit which decides which remote repeater of said plural first remote repeaters has operated first depending on the signal sent from said cable and makes effective said first remote repeater which has operated first and a second decision control circuit which remote repeater of said plural second remote repeaters has operated first depending on the signal sent from said cable and makes effective said second remote repeater which has operated first.

6. A data transmission apparatus including remote repeaters according to claim 5, wherein said first and second decision control circuits are respectively formed by,
an oscillator which outputs the clock of the frequency higher than the transmission frequency,
a first inverter which inverts output of this oscillator, a first rising differentiation detecting circuit which receives output of the first inverter and output of the second carrier detecting circuit of the first or second remote repeater of higher priority and generates output synchronized with said clock, a second rising differentiation detecting circuit which receives output of said first inverter and output of the second carrier detecting circuit of the first or second remote repeater of lower priority and generates output synchronized with said clock, a third AND circuit which conducts AND operation of two inputs, one of which is the output of said first rising differentiation circuit, a fourth AND circuit which conducts AND operation of two inputs, one of which is the output of said second rising differentiation detecting circuit, second and third inverters which invert respectively the outputs of second carrier detecting circuit of higher and lower priority, a first RS flip-flop circuit which respectively inputs output of said third AND circuit to the S input terminal and output of said second inverter to the R input terminal and sends respectively stabilized outputs to said fourth AND circuit as the other input thereto from the $\overline{Q}$ output terminal and to the second AND circuit of higher priority from the Q output terminal, and a second RS flip-flop circuit which respectively inputs output of said fourth AND circuit to the S input terminal and output of said third AND inverter to the R input terminal and sends respectively stabilized outputs to said third AND circuit as the other input thereto from the $\overline{Q}$ output terminal and to the second AND circuit of lower priority from the Q output terminal.

* * * * *

UNITED STATES PATENT AND TRADEMARK OFFICE
CERTIFICATE OF CORRECTION

PATENT NO.  :  4,872,183

DATED       :  October 3, 1989

INVENTOR(S) :  NORITAKA EGAMI

It is certified that error appears in the above-identified patent and that said Letters Patent is hereby corrected as shown below:

Col. 4, line 67, delete "10".

Col. 7, line 49, after "to" insert --the--;

Col. 7, line 61, delete "the".

Signed and Sealed this

Twenty-seventh Day of November, 1990

Attest:

HARRY F. MANBECK, JR.

*Attesting Officer*  *Commissioner of Patents and Trademarks*